(12) United States Patent
Xu

(10) Patent No.: US 12,093,499 B2
(45) Date of Patent: Sep. 17, 2024

(54) MESSAGE DISPLAY METHOD, TERMINAL DEVICE FOR DISPLAYING MESSAGES, AND STORAGE MEDIUM

(71) Applicant: BIGO TECHNOLOGY PTE. LTD., Mapletree Business (SG)

(72) Inventor: Zixu Xu, Guangzhou (CN)

(73) Assignee: BIGO TECHNOLOGY PTE. LTD., Maple Business (SG)

( * ) Notice: Subject to any disclaimer, the term of this patent is extended or adjusted under 35 U.S.C. 154(b) by 0 days.

(21) Appl. No.: 18/561,806

(22) PCT Filed: May 13, 2022

(86) PCT No.: PCT/CN2022/092822
§ 371 (c)(1),
(2) Date: Nov. 17, 2023

(87) PCT Pub. No.: WO2022/242575
PCT Pub. Date: Nov. 24, 2022

(65) Prior Publication Data
US 2024/0241614 A1  Jul. 18, 2024

(30) Foreign Application Priority Data
May 19, 2021 (CN) .......................... 202110548165.2

(51) Int. Cl.
*G06F 3/0481* (2022.01)
*G06F 3/0486* (2013.01)
*H04L 51/04* (2022.01)

(52) U.S. Cl.
CPC .......... *G06F 3/0481* (2013.01); *G06F 3/0486* (2013.01); *H04L 51/04* (2013.01)

(58) Field of Classification Search
CPC ....... G06F 3/0481; G06F 3/0486; H04L 51/04
See application file for complete search history.

(56) References Cited

U.S. PATENT DOCUMENTS

| 2010/0134425 | A1 | 6/2010 | Storrusten |
| 2011/0202837 | A1 | 8/2011 | Fong et al. |
| 2014/0362056 | A1 | 12/2014 | Zambetti et al. |
| 2016/0357368 | A1 | 12/2016 | Federighi et al. |

(Continued)

FOREIGN PATENT DOCUMENTS

| CN | 105264477 A | 1/2016 |
| CN | 205942663 U | 2/2017 |

(Continued)

OTHER PUBLICATIONS

International search report of PCT application No. PCT/CN2022/092822 issued on Jul. 25, 2022.

(Continued)

*Primary Examiner* — Andrey Belousov
(74) *Attorney, Agent, or Firm* — Dilworth & Barrese, LLP.; Michael J. Musella, Esq.

(57) ABSTRACT

Provided is a message display method, including: displaying a message display interface of a multi-user communication group; displaying a message of a target user account in the multi-user communication group in the message display interface in a first display mode; displaying a shortcut move region; displaying the message of the target user account in the message display interface in a second display mode in response to a drag operation for dragging the account identifier of the target user account from the first account display region to a second account display region; and canceling displaying of the shortcut move region in response to not receiving an operation on the shortcut move region within a predetermined period.

15 Claims, 10 Drawing Sheets

(56) References Cited

U.S. PATENT DOCUMENTS

| | | | |
|---|---|---|---|
| 2018/0335921 | A1 | 11/2018 | Karunamuni et al. |
| 2019/0102061 | A1 | 4/2019 | Fu |
| 2020/0044996 | A1 | 2/2020 | Johnson et al. |
| 2020/0073547 | A1* | 3/2020 | Zambetti ............... G06F 3/0485 |

FOREIGN PATENT DOCUMENTS

| | | |
|---|---|---|
| CN | 107404387 A | 11/2017 |
| CN | 109313530 A | 2/2019 |
| CN | 109769065 A | 5/2019 |
| CN | 110391966 A | 10/2019 |
| CN | 110768805 A | 2/2020 |
| EP | 3293611 A1 | 3/2018 |
| WO | 2020004692 A1 | 1/2020 |

OTHER PUBLICATIONS

China National Intellectual Property Administration, First office action of Chinese application No. 202110548165.2 issued on Jul. 5, 2022, which is foreign counterpart application of this US application.
China National Intellectual Property Administration, Second office action of Chinese application No. 202110548165.2 issued on Jan. 19, 2023, which is foreign counterpart application of this US application.
China National Intellectual Property Administration, Notification to grant patent right for invention of Chinese application No. 202110548165.2 issued on Apr. 26, 2023, which is foreign counterpart application of this US application.

* cited by examiner

MESSAGE DISPLAY METHOD, TERMINAL DEVICE FOR DISPLAYING MESSAGES, AND STORAGE MEDIUM

CROSS-REFERENCE TO RELATED APPLICATIONS

This application is a U.S. national stage of international application No. PCT/CN2022/092822, field on May 13, 2022, which claims priority to Chinese Patent Application No. 202110548165.2, filed on May 19, 2021, and entitled "MESSAGE DISPLAY METHOD, APPARATUS, TERMINAL DEVICE, AND STORAGE MEDIUM," the contents of which are herein incorporated by reference in their entireties.

TECHNICAL FIELD

The present disclosure relates to the technical field of application development, and in particular, relates to a message display method, a terminal device for displaying messages, and a non-transitory computer-readable storage medium.

BACKGROUND

In various social applications, users communicate with other users over a message display interface.

SUMMARY

Embodiments of the present disclosure provide a message display method, an apparatus, a terminal device, and a storage medium. The technical solutions are as follows.

According to some embodiments of the present disclosure, a message display method is provided. The method includes:
  displaying a message display interface of a multi-user communication group;
  displaying a message of a target user account in the multi-user communication group in the message display interface in a first display mode, wherein the first display mode is a mode in which the message is displayed along a first side edge of the message display interface; and
  displaying the message of the target user account in the message display interface in a second display mode in response to a message position adjust operation on an account identifier of the target user account, wherein the second display mode is a mode in which the message is displayed along a second side edge of the message display interface, and the second side edge is opposite to the first side edge.

According to some embodiments of the present disclosure, a terminal device for displaying messages is provided. The terminal device includes a processor, and a memory storing one or more computer programs. The processor, when loading and running the one or more computer programs, is caused to perform the message display method as described above.

According to some embodiments of the present disclosure, a non-transitory computer-readable storage medium is provided. The non-transitory computer-readable storage medium stores one or more computer programs, wherein the one or more computer programs, when loaded and run by a processor, cause the processor to perform the message display method as described above.

According to some embodiments of the present disclosure, a computer program product is provided. The computer program product, when loaded and run by a processor, causes the processor to perform the message display method as described above.

DETAILED DESCRIPTION

Exemplary embodiments will be described in detail herein, examples of which are represented in the accompanying drawings. When the following description relates to the accompanying drawings, the same numerals in the different accompanying drawings indicate the same or similar elements unless otherwise indicated. The embodiments described in the following exemplary embodiments do not represent all embodiments consistent with the present application. Rather, they are only examples of methods consistent with some aspects of this application as detailed in the appended claims.

In some practices, messages from users are displayed on a left or right side of the message display interface. For example, a user's own messages are displayed on the right side of the message display interface, and messages from other users are displayed on the left side of the message display interface.

Figure 1:
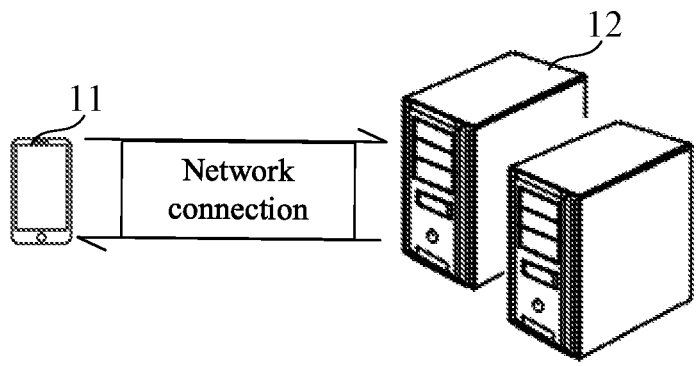
FIG. 1 is a schematic diagram of an implementation environment according to some embodiments of the present disclosure.

FIG. 1 is a schematic diagram of an implementation environment according to some embodiments of the present disclosure. Referring to FIG. 1, the implementation environment is achieved as a message display system. The system 10 includes a terminal device 11.

A target application, such as a client of the target application, is installed and running on the terminal device 11. A user account of a first user is logged into the client, and the first user is a user corresponding to the terminal device 11. The terminal device is an electronic device having capabilities in data computing, processing, and storage, such as a smartphone, a tablet computer, a personal computer (PC), or a wearable device, which is not limited herein. Alternatively, the terminal device is a terminal device having a touch screen over which the user is capable of achieving human-computer interactions. The target application is an instant messaging (IM) application, a social application, a gaming application, a music application, a payment application, a video application, a life service application, a shopping application, a news application, or any other application having a message display function. In the method according to the embodiments of the present disclosure, each step is performed by the terminal device 11, such as the client running in the terminal device 11.

In some embodiments, the system 10 further includes a server 12. The server 12 establishes a communication connection (e.g., a network connection) with the terminal device 11 and is configured to provide background services for the target application. The server is a standalone physical server, a server cluster or distributed system consisting of a plurality of physical servers, or a cloud server providing cloud computing services.

The technical solutions of the present disclosure are described and illustrated hereinafter by several embodiments.

Figure 2:
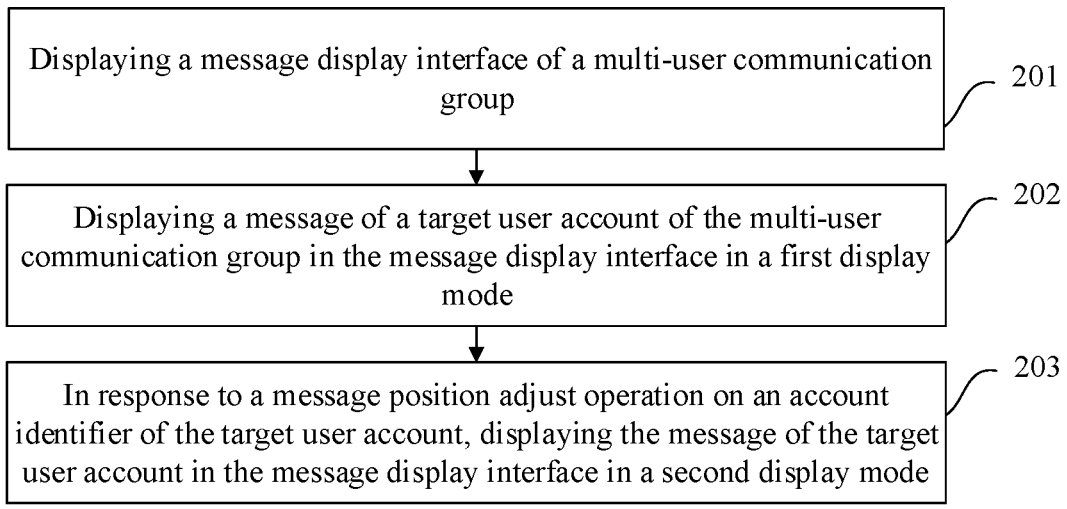
FIG. 2 is a flowchart of a message display method according to some embodiments of the present disclosure.

FIG. 2 is a flowchart of a message display method according to some embodiments of the present disclosure. Referring to FIG. 2, in some embodiments, the description is given using a scenario where the method is applied to the client described above. The method includes the following steps (201-203).

In step 201, a message display interface of a multi-user communication group is displayed.

In some embodiments, the multi-user communication group is a communication group containing a plurality of user accounts (i.e., user accounts of a plurality of group members), and some or all of the plurality of user accounts send messages in the multi-user communication group. An interface of the client that displays the messages of the user accounts is the message display interface. The message display interface also displays information such as a group name, the number of group members, a send time of a message, a group level, and a group type of the multi-user communication group.

In step 202, a message of a target user account of the multi-user communication group is displayed in the message display interface in a first display mode.

In some embodiments, the first display mode is a mode in which a message is displayed along a first side edge of the message display interface. In some embodiments, the message display interface includes a plurality of side edges. For example, in the case that the message display interface is rectangular, the message display interface includes a left side edge, a right side edge, an upper side edge, and a lower side edge. In some embodiments, the first side edge is the left side edge or the right side edge. In some embodiments, the target user account is a user account of the plurality of user accounts. The target user account is a user account of the first user or a user account of a user other than the first user, which is not limited herein.

Figure 3:
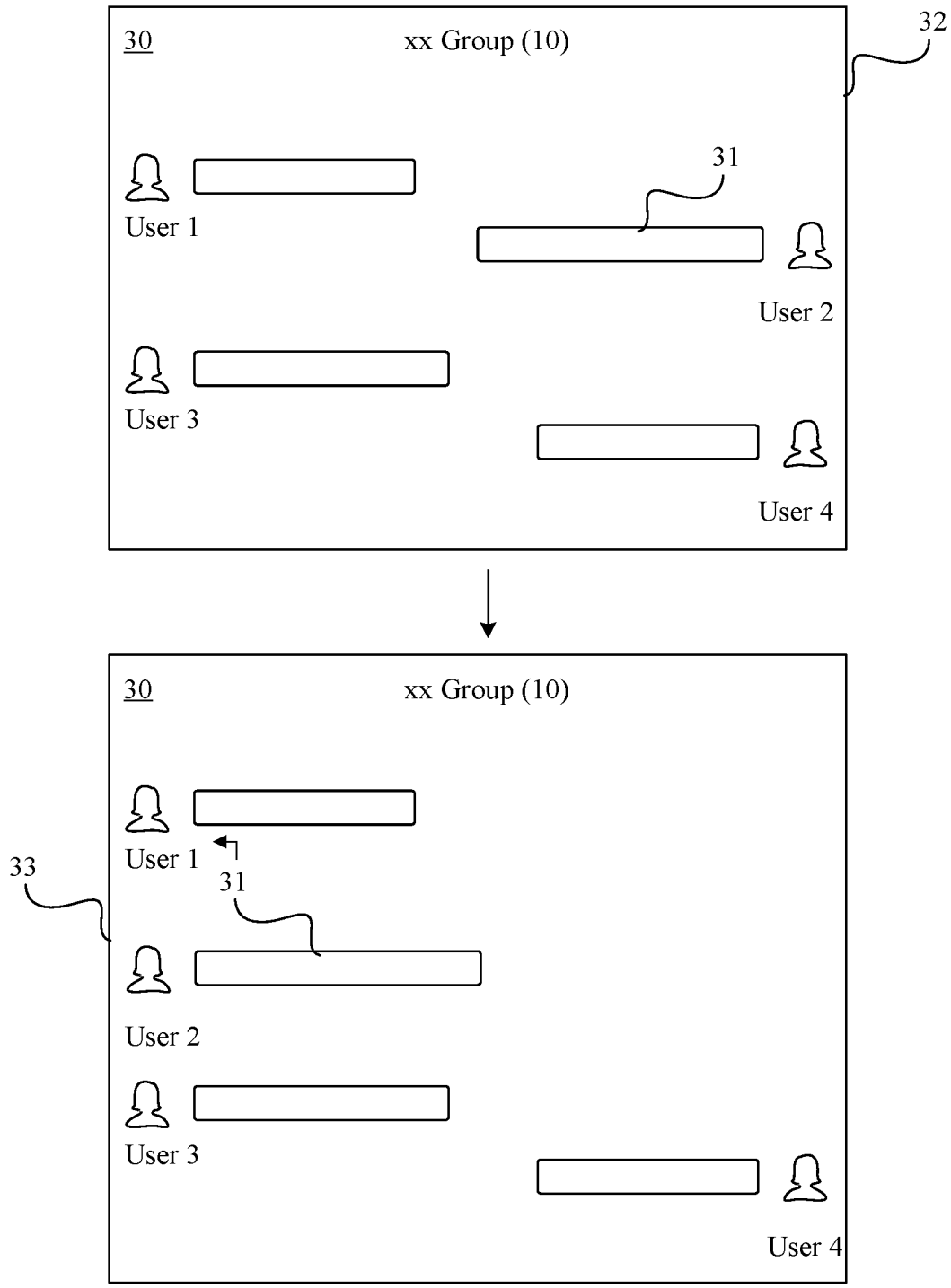
FIG. 3 is a schematic diagram of a message display interface according to some embodiments of the present disclosure.

In some embodiments, as illustrated in FIG. 3, under the first display mode, the message 31 of the target user account is displayed along the right side edge 32 (i.e., the first side edge) of the message display interface 30.

In some embodiments, the messages of the target user account include character messages, picture messages, video messages, voice messages, and emoji messages (e.g., emoticons). In some embodiments, under the first display mode, all the messages of the target user account in the message display interface are displayed along the first side edge.

In step 203, in response to a message position adjust operation on an account identifier of the target user account, the message of the target user account is displayed in the message display interface in a second display mode.

In some embodiments, the second display mode is a mode in which the message is displayed along a second side edge of the message display interface, and the second side edge is opposite to the first side edge. In some embodiments, the account identifiers of the target user account include an avatar, a nickname, and an account identity document (ID) of the target user account. In some embodiments, as illustrated in FIG. 3, in response to receiving the message position adjust operation on the account identifier of the target user account, displaying of the message 31 of the target user account on the right side edge 32 (i.e., the first side edge) of the message display interface 30 is cancelled, and the message 31 of the target user account is redisplayed on the left side edge 33 (i.e., the second side edge) of the message display interface 30.

In some embodiments, under the second display mode, all the messages of the target user account in the message display interface are displayed along the second side edge.

In some embodiments, the messages in the multi-user communication group are displayed along the left side edge or the right side edge of the message display interface. However, an ordering of up and down positions of the messages (i.e., longitudinal distances between the messages) is determined according to the send time of each message. That is, messages sent earlier are often displayed above messages sent later. Even if the display mode of the user messages changes (e.g., the display mode changes from the first display mode to the second display mode or from the second display mode to the first display mode), the ordering of the up and down positions of the messages does not change.

In summary, in the technical solution according to some embodiments of the present disclosure, the message of the target user account displayed on the first side edge of the message display interface is displayed on the second side edge opposite to the first side edge in the interface by the message position adjust operation, such that the user is capable of deciding on which side edge the message of the target user account is displayed in his or her own mind, and thus the flexibility of the user message in the message display interface is improved.

In addition, in some embodiments of the present disclosure, display positions of the plurality of messages of the target user account are adjusted by one message position adjust operation on the account identifier of the target user account, such that the efficiency in adjusting the display positions of the user messages is improved.

In some embodiments, in the message display interface, the message of the target user account correspondingly displays the account identifier of the target user account. In some embodiments, step 203 includes the following substeps.

1. In response to a drag operation on the account identifier of the target user account, the account identifier of the target user account is controlled to move with the drag operation.
2. In response to the account identifier of the target user account being located in a screen region corresponding to the second side edge, the message of the target user account is displayed in the message display interface in the second display mode.

In the embodiments, in response to the drag operation on the account identifier of the target user account displayed next to the corresponding message, the account identifier of the target user account is dragged from a screen region corresponding to the first side edge to the screen region corresponding to the second side edge, and the message of the target user account is displayed along the second side edge in the message display interface.

In some embodiments, the account identifier of the target user account is dragged only after it has been pressed for a predetermined duration. In some embodiments, the predetermined duration is 1 second, 1.5 seconds, 2 seconds, or 3 seconds. The specific length of the predetermined duration is defined by those skilled in the art according to the actual situation, which is not limited herein.

Figure 4:
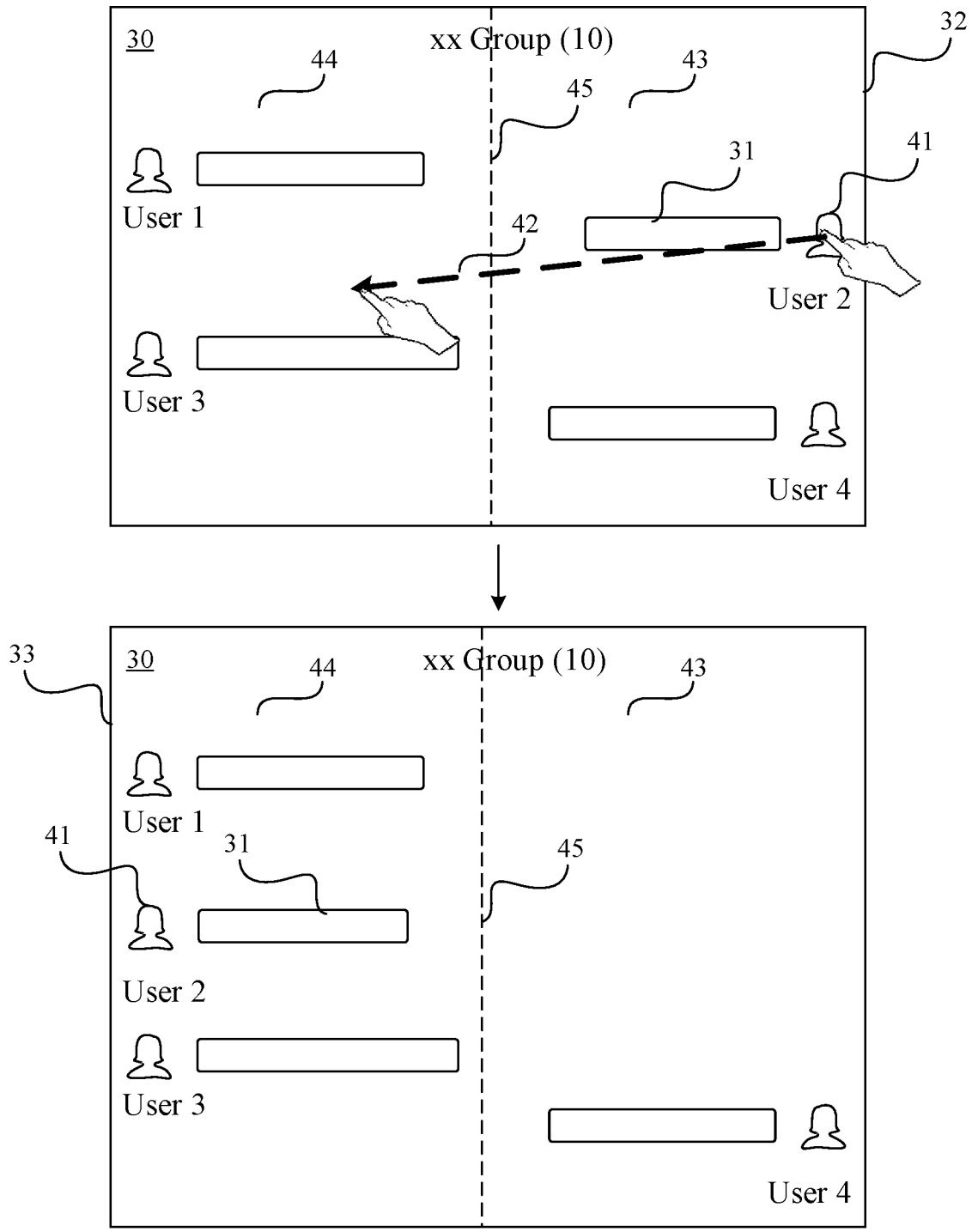
FIG. 4 is a schematic diagram of another message display interface according to some embodiments of the present disclosure.

In some embodiments, as illustrated in FIG. 4, the account identifier 41 of the target user account is displayed next to the message of the target user account, and the user drags the account identifier 41 of the target user account from the screen region 43 corresponding to the right side edge 32 (i.e., the first side edge) to the screen region 44 corresponding to the left side edge 33 (i.e., the second side edge) through the drag operation 42 on the account identifier 41 of the target user account, and then the message 31 of the target user account is displayed along the left side edge 33 of the message display interface 30. In some embodiments, when dragging the account identifier 41 of the target user account, as long as the account identifier 41 of the target user account is dragged into the screen region 44 corresponding to the left side edge 33, the drag operation is considered as a valid operation, and the message 31 of the target user account is displayed along the left side edge 33. In other embodiments, in the case that the account identifier 41 of the target user account is dragged to a position where a distance between the account identifier 41 and the left side edge 33 is less than a predetermined distance, the drag operation is considered as a valid operation, and the message 31 of the target user account is displayed along the left side edge 33. The predetermined distance is less than a width of the screen region 44 corresponding to the left side edge 33.

The screen region corresponding to the left side edge and the screen region corresponding to the right side edge described above are arranged as the following examples.

Example (1): as illustrated in FIG. 4, the screen region 44 corresponding to the left side edge 33 and the screen region 43 corresponding to the right side edge 32 are divided according to a center line 45 of the message display interface 30. That is, a left region of the center line 45 of the message display interface 30 is the screen region 44 corresponding to the left side edge 33, and a right region of the center line 45 of the message display interface 30 is the screen region 43 corresponding to the right side edge 32.

Example (2): the screen region corresponding to the left side edge is a rectangle with the left side edge as an edge, and a transverse width of the screen region corresponding to the left side edge is L1. The screen region corresponding to the right side edge is a rectangle with the right side edge as an edge, and a transverse width of the screen region corresponding to the right side edge is L2. A transverse width of the message display interface is Lmax. Obviously, L1+L2≤Lmax. L1 and L2 are equal or unequal, and a ratio of L1 (or L2) to Lmax is 1/3, 1/4, or 1/5. In some embodiments, the specific ratio of L1 (or L2) to Lmax is defined by those skilled in the art according to the actual situation, which is not limited herein. The above example (1) is a special case in which L1=L2 and L1+L2=Lmax. In some examples, L1=L2=1/3Lmax. In other examples, L1=1/3Lmax and L2=1/4Lmax.

In some embodiments, the drag operation on the account identifier of the target user account displayed next to the corresponding message is a drag operation along a direction toward the second side edge. For example, in the case that the message of the target user account is displayed on the right side edge of the message display interface, the account identifier of the target user account is dragged to the left, and thus the message of the target user account is displayed along the left side edge in the message display interface. That is, as long as the drag operation for dragging the account identifier of the target user account to the left is received, regardless of whether a termination position of the drag operation is in the screen region corresponding to the left side edge, the drag operation is considered as a valid operation, and the message of the target user account is displayed along the left side edge (i.e., displayed in the second display mode).

In the embodiments, the position/region where the user message is displayed is adjusted by directly performing the drag operation on the account identifier of the target user account located next to the corresponding message, such that the operation has fewer steps and is intuitive and convenient.

Figure 5:
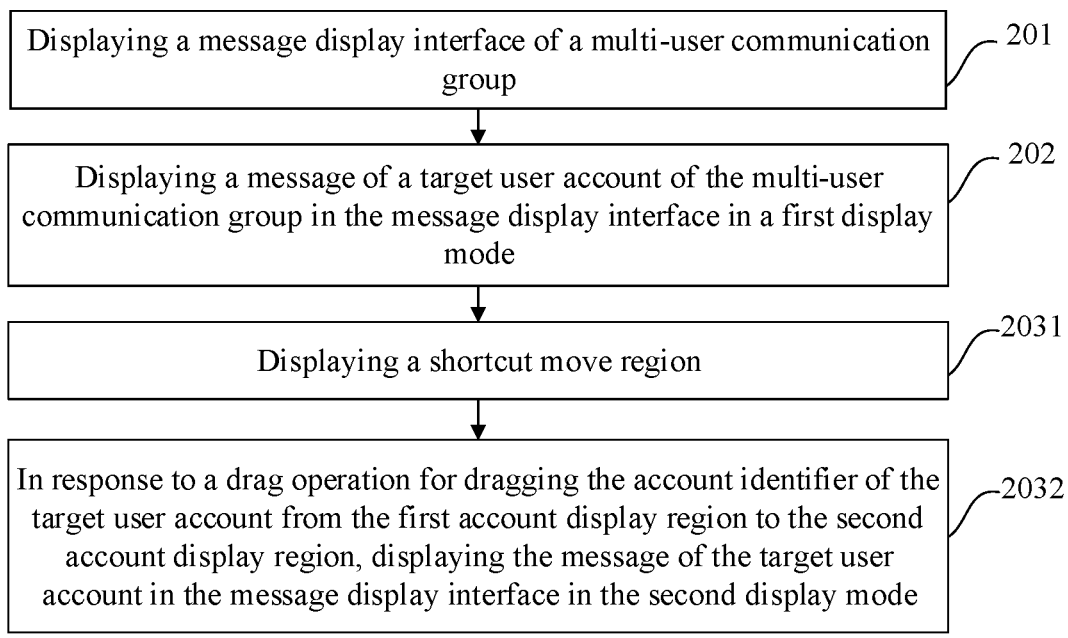
FIG. 5 is a flowchart of another message display method according to some embodiments of the present disclosure.

In some embodiments, as illustrated in FIG. 5, step 203 described above includes the following sub-steps (2031 and 2032).

In step 2031, a shortcut move region is displayed.

In some embodiments, a shortcut move region is displayed in the client (e.g., the shortcut move region is displayed in the message display interface), and account identifiers of user accounts respectively corresponding to the messages in the message display interface are displayed in the shortcut move region. In some embodiments, the shortcut move region includes a first account display region and a second account display region, and the account identifier of the target user account is displayed in the first account display region. The account identifier displays a user account which is in the first account display region, whose corresponding message is displayed in the message display interface in the first display mode, i.e., displayed along the first side edge of the message display interface. The account identifier displays a user account which is in the second account display region, whose corresponding message is displayed in the message display interface in the second display mode, i.e., displayed along the second side edge of the message display interface.

In some embodiments, the method further includes the following steps.
1. A region display control is displayed in a side edge region of the message display interface.
2. The shortcut move region is displayed in response to a trigger operation on the region display control.

In the embodiments, the region display control is displayed in the side edge region (e.g., a region near the left side edge, a region near the right side edge, a region near the upper side edge, or a region near the lower side edge) of the message display interface, and whether to display the shortcut move region and a display position of the shortcut move region are determined by the region display control. In some embodiments, the region display control is displayed against an edge of the message display interface, such as against the left side edge, the right side edge, the upper side edge, or the lower side edge of the message display interface.

Figure 6:
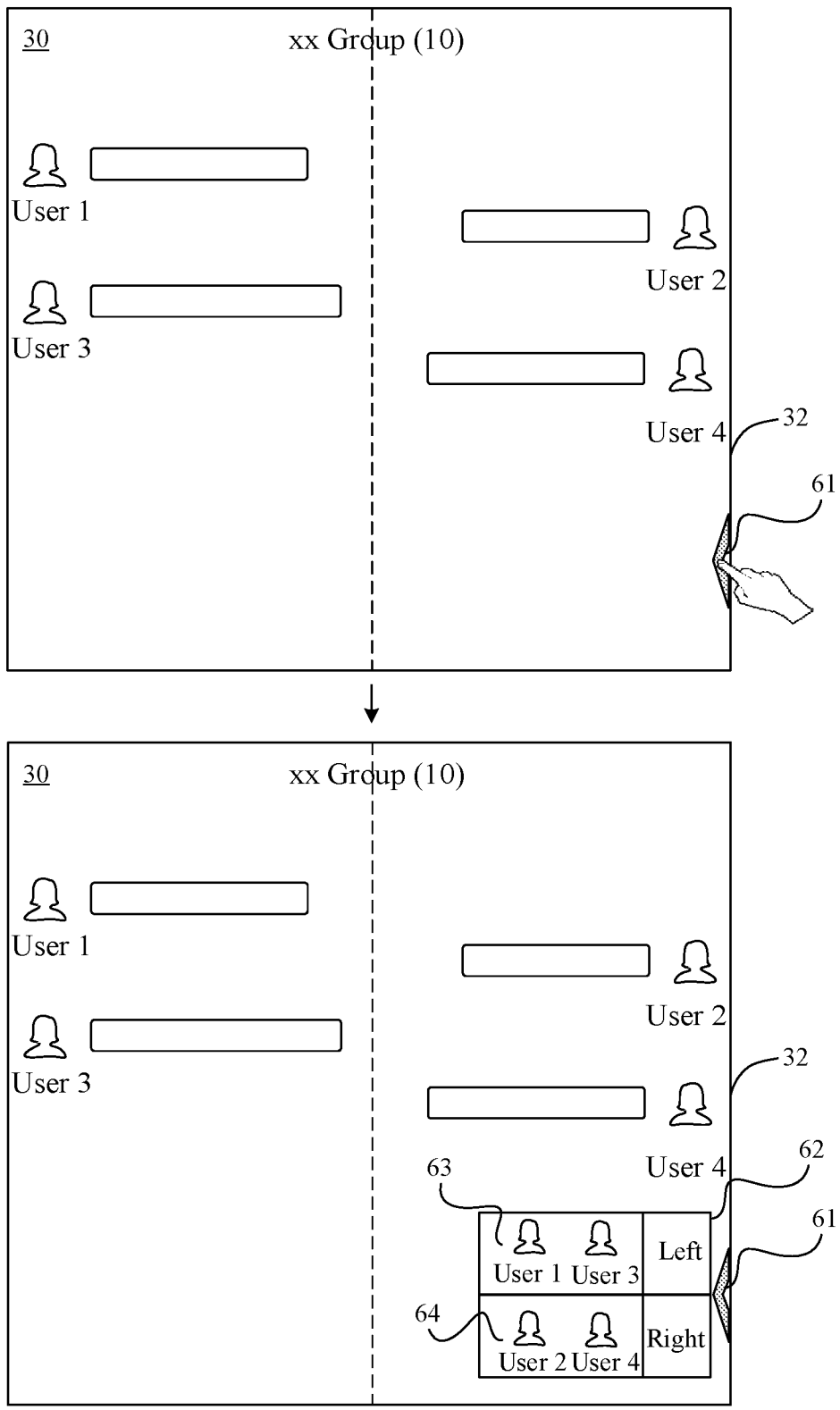
FIG. 6 is a schematic diagram of still another message display interface according to some embodiments of the present disclosure.

In some embodiments, as illustrated in FIG. 6, the region display control 61 is displayed against the right side edge 32 of the message display interface 30, and the shortcut move region 62 is displayed in a vicinity of the region display control 61 in response to receiving the trigger operation on the region display control 61. In some embodiments, the shortcut move region 62 includes the first account display region 63 and the second account display region 64. The account identifier displays a user account which is in the first account display region 63, whose corresponding message is displayed in the message display interface 30 in the first display mode, i.e., displayed along the left side edge of the message display interface 30. The account identifier displays a user account which is in the second account display region 64, whose corresponding message is displayed in the message display interface 30 in the second display mode, i.e., displayed along the right side edge of the message display interface 30.

Figure 7:
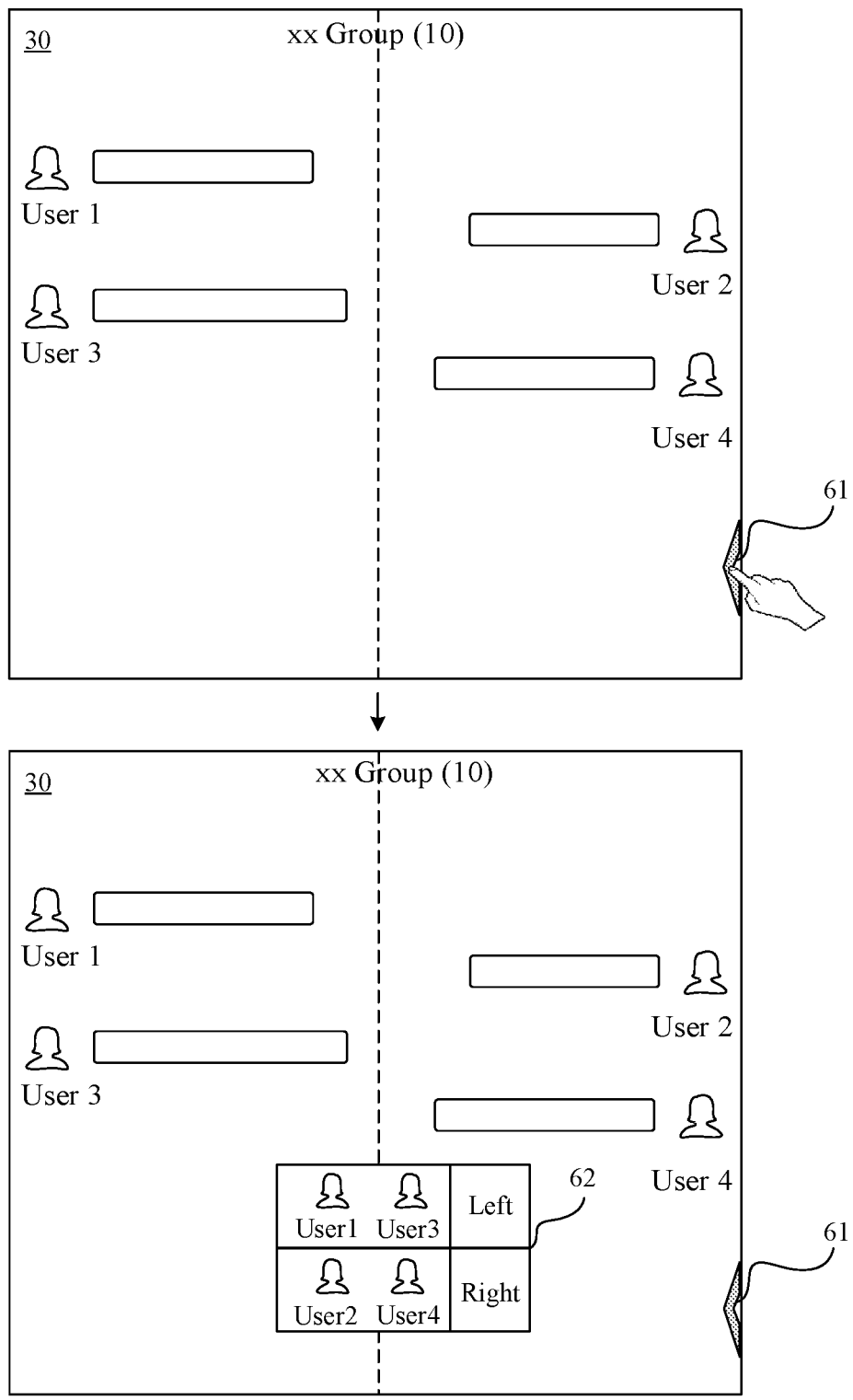
FIG. 7 is a schematic diagram of yet still another message display interface according to some embodiments of the present disclosure.

In some other embodiments, in response to the trigger operation on the region display control, the shortcut move regions are displayed in other predetermined regions of the message display interface. In some embodiments, as illustrated in FIG. 7, in response to the trigger operation on the region display control 61, the shortcut move region 62 is displayed in a lower-middle region of the message display interface 30.

In some embodiments, the method further includes the following steps.
1. Updated display positions of the region display control and the shortcut move region are determined in response to a move operation on the region display control and the shortcut move region.
2. The region display control and the shortcut move region are displayed based on the updated display positions of the region display control and the shortcut move region.

In the embodiments, the user is capable of adjusting the display positions of the region display control and the shortcut move region, such that the display flexibility of the region display control and the shortcut move region and the convenience of the user operation are improved by triggering the display of the shortcut move region and performing the operation on the shortcut move region. In some embodiments, in the case that the region display control is displayed against the first side edge of the message display interface, the region display control is moved to be displayed on the second side edge or another position of the first side edge by moving the region display control, and a position of the region display control after the movement is the updated display position of the region display control. In some embodiments, relative positions of the region display control and the shortcut move region are fixed, and thus in the case that the display position of the region display control changes, the display position of the shortcut move region changes accordingly.

In some embodiments, upon step 2031, displaying of the shortcut move region is canceled in response to not receiving an operation on the shortcut move region within a predetermined period. In some embodiments, the predetermined period is 3 seconds, 5 seconds, 8 seconds, or 10 seconds, and the specific duration of the predetermined period is defined by those skilled in the art according to the actual situation, which is not limited herein. In some embodiments, not receiving the operation on the shortcut move region during the predetermined period refers to not receiving a touch operation on the shortcut move region by the user during the predetermined period. In the embodiments, in the case that the user does not perform an operation on the shortcut move region within the predetermined period, it is considered that the shortcut move region does not need to be displayed for the time being, and then displaying of the shortcut move region is automatically canceled, such that the manual operation for the user is reduced and a duration in which the message display interface is blocked by the shortcut move region is reduced.

In some other embodiments, upon step 2031, displaying of the shortcut move region is canceled in response to receiving a region close operation on the shortcut move region. The region close operation is an operation (e.g., tap, double-tap, swipe, and long-press) on the region display control, or an operation (e.g., tap, double-tap, swipe, and long-press) on the shortcut move region. In some embodiments, the shortcut move region and the region close control are simultaneously displayed, and in response to receiving the close operation (e.g., tapping the region close control) on the region close control, displaying of the shortcut move region is canceled. Displaying of the shortcut move region is canceled in other ways, which is not limited herein.

In step 2032, in response to a drag operation for dragging the account identifier of the target user account from the first account display region to the second account display region, the message of the target user account is displayed in the message display interface in the second display mode.

Figure 8:
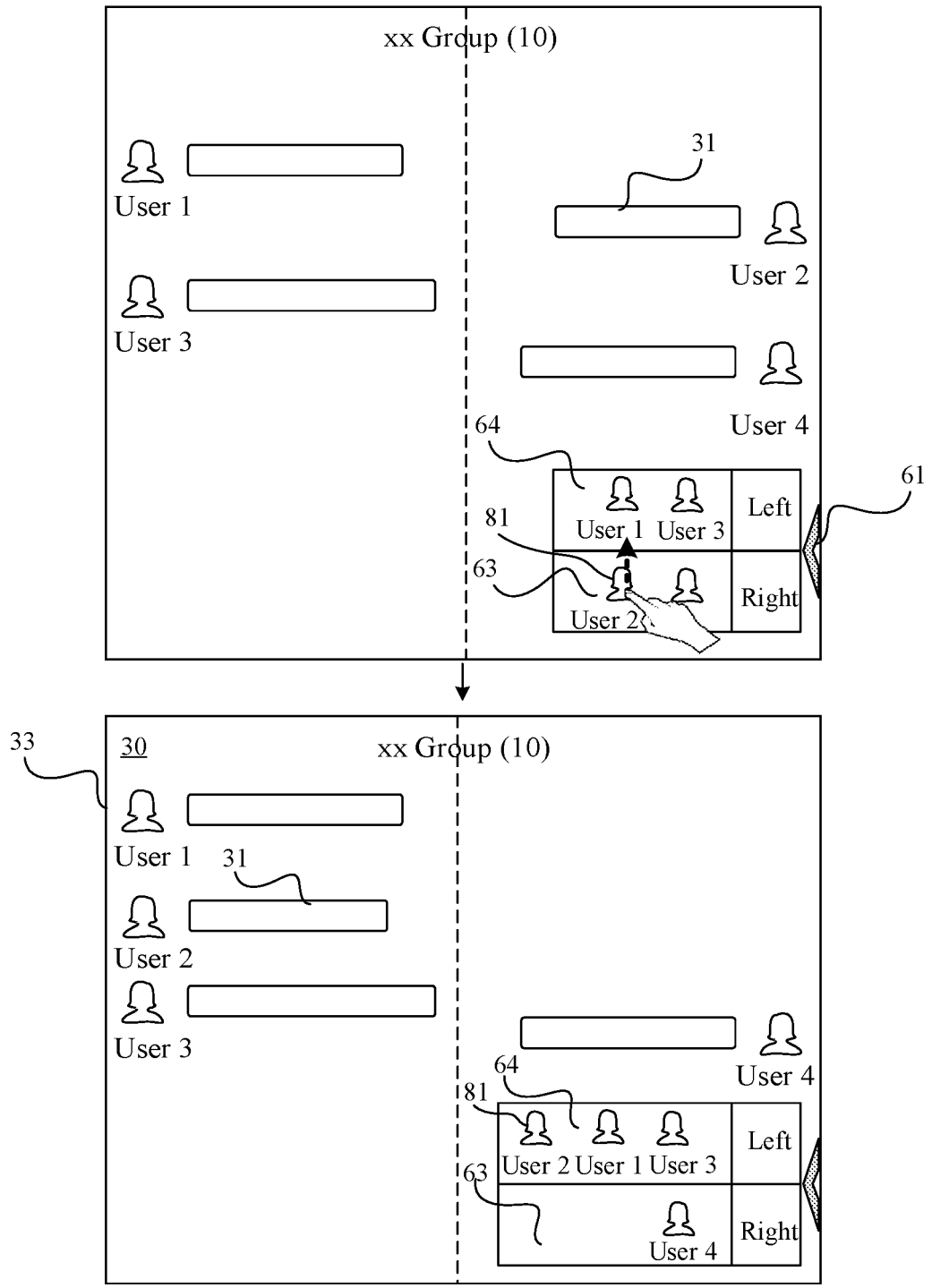
FIG. 8 is a schematic diagram of yet still another message display interface according to some embodiments of the present disclosure.

In some embodiments, as illustrated in FIG. 8, the second account display region 64 corresponds to the second display mode. After the user drags the account identifier 81 of the target user account from the first account display region 63 to the second account display region 64, the account identifier 81 of the target user account is displayed in the second account display region 64. Therefore, the message 31 of the target user account needs to be displayed in the second display mode, i.e., along the second side edge 33 of the message display interface 30.

In some embodiments, a touch event (i.e., the message position adjust operation) of the account identifier of the target user account is listened. In response to receiving the touch event (i.e., a touch operation) on the account identifier of the target user account, a move event (i.e., the drag operation) on the account identifier of the target user account is started to be received, and it is determined that the account identifier of the target user account is being dragged. Afterward, coordinates of the move event in the screen are acquired, and the account identifier of the target user account is moved to the corresponding coordinates. In response to receiving a touch-up event, the drag operation is determined to be finished, and a horizontal coordinate corresponding to the touch-up event is acquired. In the case that the horizontal coordinate corresponding to the touch-up event is less than ½ of the width of the message display interface, the touch-up event is in the screen region corresponding to the second side edge, and the drag operation is a valid operation. Afterward, a key value is used to indicate the display mode of the message of the target user account (i.e., to indicate the display position of the message of the target user account). In some embodiments, the key is of a string type and is stored as an ID of a current message. The value is of a list type and is stored as an account ID of a user account whose message is to be displayed along the first side edge, and messages of other user accounts are to be displayed along the second side edge. In the case that the account identifier of the target user account is dragged into the screen region corresponding to the first side edge, an account ID of the target user account is stored in the list. In the case that the account identifier of the target user account is dragged into the screen region corresponding to the second side edge, the account ID of the target user account is removed from the list. Afterward, the message display interface is refreshed, the messages in the message display interface are redisplayed based on the updated list, and the updated list is stored into a local file cache, such that after the client exits the message display interface and re-enters the message display interface, the message display interface still displays the messages of the user accounts based on the updated list.

In the embodiments, the shortcut move region is displayed, and the account identifier of the user account is displayed in the shortcut move region, such that the display mode of each user account is adjusted by the drag operation in the shortcut move region, and thus the operating distance of the user is reduced and the operating efficiency is improved.

Figure 9:
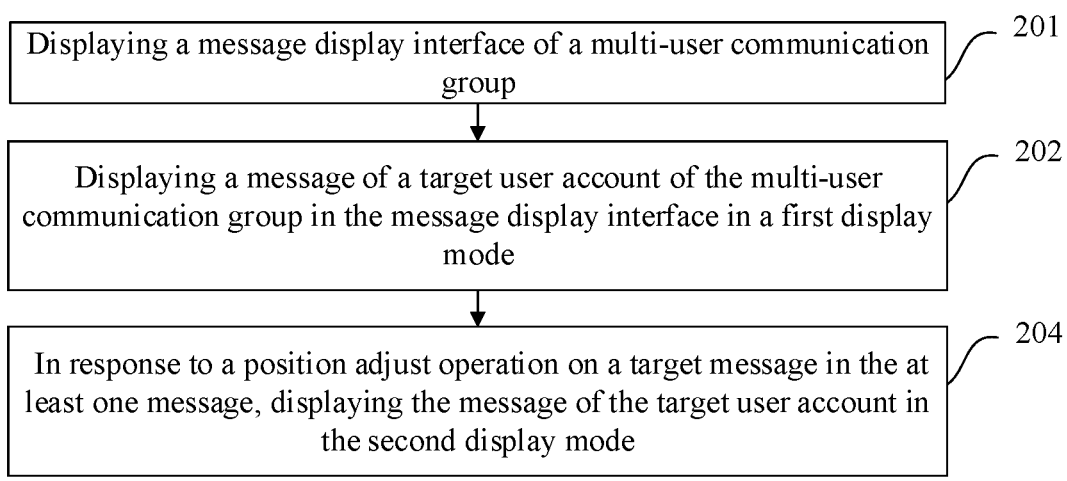
FIG. 9 is a flowchart of still another message display method according to some embodiments of the present disclosure.

In some embodiments, as illustrated in FIG. 9, the target user account corresponds to at least one message. In some embodiments, upon step 202, the method further includes the following steps.

In step 204, in response to a position adjust operation on a target message in the at least one message, the message of the target user account is displayed in the second display mode.

Figure 10:
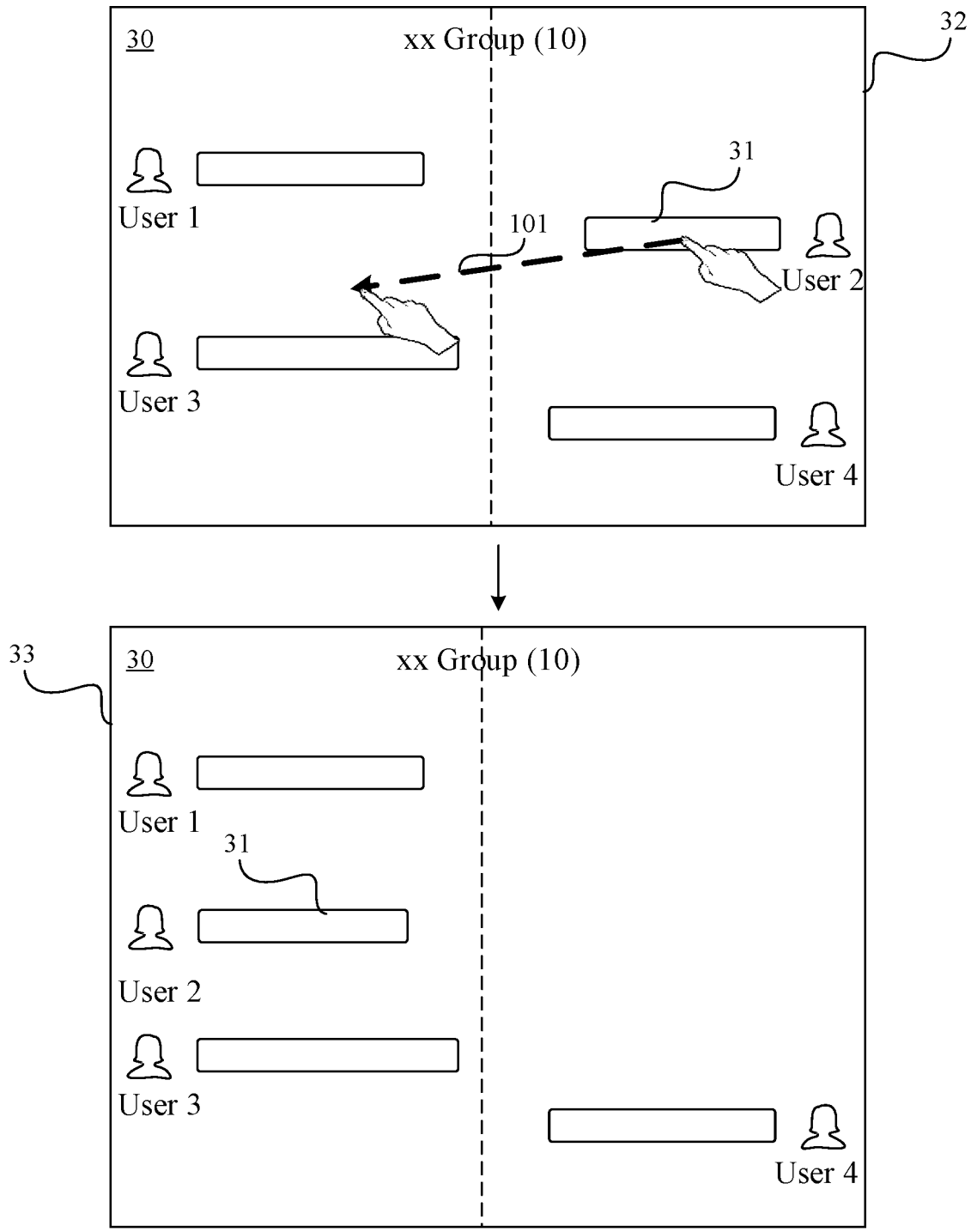
FIG. 10 is a schematic diagram of yet still another message display interface according to some embodiments of the present disclosure.

In some embodiments, as illustrated in FIG. 10, a plurality of messages are displayed in the message display interface 30, and the target message 31 of the plurality of messages is the message of the target user account. By the position adjust operation 101 on the target message 31, the message of the target user account is changed from the first display mode to the second display mode, i.e., from being displayed along the first side edge 32 of the message display interface 30 to being displayed along the second side edge 33. In some embodiments, the position adjust operation is a drag operation on the target message, such as dragging the target message from the screen region corresponding to the first side edge to the screen region corresponding to the second side edge. In other embodiments, the position adjust operation is a swipe operation on the target message. A starting position of the swipe operation is a region where the target message is displayed, and a swipe direction of the swipe operation is the direction toward the second side edge. In some embodiments, in the case that an acute angle formed between the swipe direction of the swipe operation and the second side edge is greater than a predetermined angle, the swipe operation is a valid operation. That is, the target message is capable of changing the display mode based on the swipe direction of the swipe operation. In some embodiments, the predetermined angle is 60°, 70°, 75°, 80°, or other values defined by those skilled in the art according to the actual situation, which is not limited herein.

In the embodiments, all the messages displayed by the target user account in the message display interface are displayed in the second display mode by the position adjust operation on a message (i.e., the target message) of the target user account in the message display interface, which is convenient and fast.

In addition, in some embodiments, the first user corresponding to the client decides the display modes of the messages of the user accounts in the client according to message contents of the user accounts, such as determining the message of the target user account to be displayed in the first mode or the second mode. In some embodiments, the first user corresponding to the client adjusts the display modes of the user accounts according to the corresponding viewpoints of the user accounts, such as the viewpoints on the same topic (e.g., a debate topic), such that messages of user accounts holding opposing viewpoints are displayed along two opposite side edges of the message display interface and messages of user accounts holding the same or similar viewpoints are displayed along the same side edge, and thus the messages in the message display interface are displayed in a more organized manner. In other embodiments, in the case that a game or a match requiring the division of camps (e.g., two opposing camps) is conducted in the multi-user communication group, the target user also displays, according to the camps of the user accounts, messages of user accounts in different camps along two opposite side edges of the message display interface, and displays messages of user accounts in the same camp along the same side edge, such that the status of the game or match is clearer, and it is convenient for users to check and understood the messages in the message display interface.

Hereinafter described are apparatus embodiments of the present disclosure, which are applicable to practice the method embodiments of the present disclosure. For details not disclosed in the apparatus embodiments, reference is made to the method embodiments.

Figure 11:
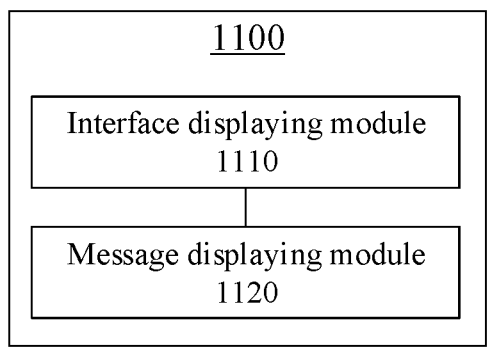
FIG. 11 is a block diagram of a message display apparatus according to some embodiments of the present disclosure.
Figure 12:
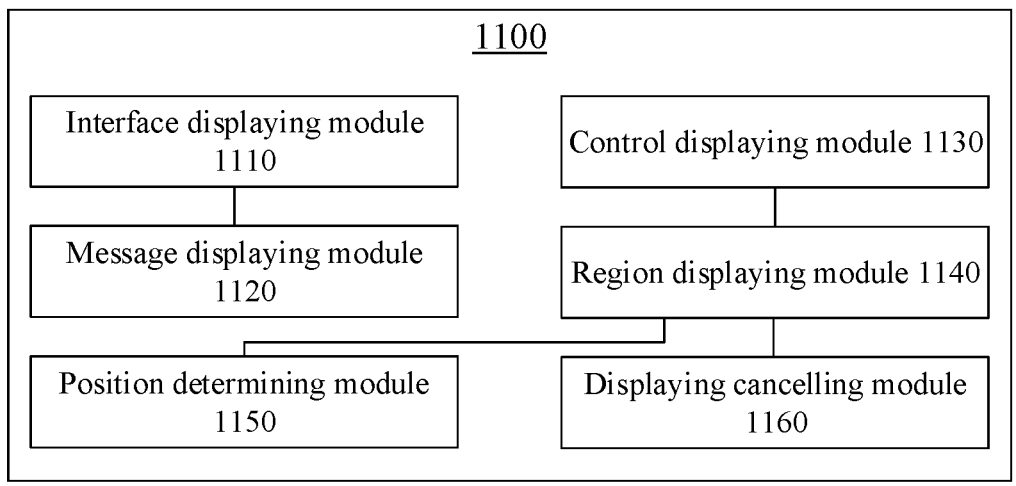
FIG. 12 is a block diagram of another message display apparatus according to some embodiments of the present disclosure.

FIG. 11 is a block diagram of a message display apparatus according to some embodiments of the present disclosure. Referring to FIG. 11, the apparatus has a function to implement the message display method described above, and the function is implemented by hardware or by hardware running corresponding software. The apparatus is the terminal device as described above or is arranged on the terminal device. The apparatus 1100 includes an interface displaying module 1110 and a message displaying module 1120. The interface displaying module 1110 is configured to display a message display interface of a multi-user communication group. The message displaying module 1120 is configured to display a message of a target user account in the multi-user communication group in the message display interface in a first display mode, wherein the first display mode is a mode in which the message is displayed along a first side edge of the message display interface. The message displaying module 1120 is further configured to display the message of the target user account in the message display interface in a second display mode in response to a message position adjust operation on an account identifier of the target user account, wherein the second display mode is a mode in which the message is displayed along a second side edge of the message display interface, and the second side edge is opposite to the first side edge.

In summary, in the technical solution according to the embodiments of the present disclosure, the message of the target user account displayed on the first side edge of the message display interface is displayed on the second side edge opposite to the first side edge in the message display interface by the message position adjust operation, such that the user is capable of deciding on which side edge the message of the target user account is displayed in his or her own mind, and thus the flexibility of the user message in the message display interface is improved.

In some embodiments, in the message display interface, the message of the target user account correspondingly displays the account identifier of the target user account; and the message displaying module 1120 is configured to: in response to a drag operation on the account identifier of the target user account, control the account identifier of the target user account to move with the drag operation; and in response to the account identifier of the target user account being in a screen region corresponding to the second side edge, display the message of the target user account in the message display interface in the second display mode.

In some embodiments, the message displaying module 1120 is configured to: display a shortcut move region, wherein the shortcut move region includes a first account display region and a second account display region, and the account identifier of the target user account is displayed in the first account display region; and in response to a drag operation for dragging the account identifier of the target user account from the first account display region to the second account display region, display the message of the target user account in the message display interface in the second display mode.

In some embodiments, as illustrated in FIG. 10, the apparatus 1100 further includes a control displaying module 1130 and a region displaying module 1140. The control displaying module 1130 is configured to display a region display control in a side edge region of the message display interface. The region displaying module 1140 is configured to display the shortcut move region in response to a trigger operation on the region display control.

In some embodiments, as illustrated in FIG. 10, the apparatus 1100 further includes a position determining module 1150. The position determining module 1150 is configured to determine updated display positions of the region display control and the shortcut move region in response to a move operation on the region display control and the shortcut move region. The region displaying module 1140 is further configured to display the region display control and the shortcut move region based on the updated display positions of the region display control and the shortcut move region.

In some embodiment, as illustrated in FIG. 10, the apparatus 1100 further includes a displaying cancelling module 1160. The displaying cancelling module 1160 is configured to cancel displaying of the shortcut move region in response to not receiving an operation on the shortcut move region within a predetermined period.

In some embodiments, the target user account corresponds to at least one message; and the message displaying module 1120 is further configured to display the message of the target user account in the second display mode in response to a position adjust operation on a target message in the at least one message.

It should be noted that description is only given to the division of the functional modules for the apparatus according to the above embodiments in realizing its functions. In practice, the functions of the apparatus may be assigned to and implemented by different functional modules according to actual needs. That is, in terms of internal structure, the apparatus is divided into different functional modules to implement a part or all of the functions as described above. In addition, the apparatus according to the above embodiments is based on the same concept as the method embodiments as described above, and the specific implementation process of the apparatus is detailed in the method embodiments, which is not repeated herein.

In some embodiments, a computer-readable storage medium is provided. The computer-readable storage medium stores one or more instructions therein, wherein the one or more instructions, when loaded and run by a processor, cause the processor to perform the message display method as described above.

In some embodiments, a computer program product is provided. The computer program product, when loaded and run by a processor, causes the processor to perform the message display method as described above.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A message display method, comprising:
    displaying a message display interface of a multi-user communication group;
    displaying a message of a target user account in the multi-user communication group in the message display interface in a first display mode, wherein the first display mode is a mode in which the message is displayed along a first side edge of the message display interface, an account identifier corresponding to the message in the first display mode is displayed between the message in the first display mode and the first side edge, and the account identifier comprises at least one of an avatar, a nickname, and an account identity document;
    displaying a shortcut move region, wherein the shortcut move region comprises a first account display region and a second account display region, and an account identifier of the target user account is displayed in the first account display region;
    displaying the message of the target user account in the message display interface in a second display mode in response to a drag operation for dragging the account identifier of the target user account from the first account display region to the second account display region, wherein the second display mode is a mode in which the message is displayed along a second side edge of the message display interface, an account identifier corresponding to the message in the second display mode is displayed between the message in the second display mode and the second side edge, the second side edge is opposite to the first side edge, and the first side edge and the second side edge correspond to different viewpoints or camps; and
    canceling displaying of the shortcut move region in response to not receiving an operation on the shortcut move region within a predetermined period.

2. The method according to claim 1, wherein
    in the message display interface, the message of the target user account correspondingly displays the account identifier of the target user account; and
    displaying the message of the target user account in the message display interface in the second display mode in response to the message position adjust operation on the account identifier of the target user account comprises:
        controlling, in response to a drag operation on the account identifier of the target user account, the account identifier of the target user account to move with the drag operation; and
        displaying the message of the target user account in the message display interface in the second display mode in response to the account identifier of the target user account being in a screen region corresponding to the second side edge.

3. The method according to claim 1, further comprising:
displaying a region display control in a side edge region of the message display interface; and
displaying the shortcut move region in response to a trigger operation on the region display control.

4. The method according to claim 3, further comprising:
determining updated display positions of the region display control and the shortcut move region in response to a move operation on the region display control and the shortcut move region; and
displaying the region display control and the shortcut move region based on the updated display positions of the region display control and the shortcut move region.

5. The method according to claim 1, wherein
the target user account corresponds to at least one message; and
upon displaying the message of the target user account in the multi-user communication group in the first display mode, the method further comprises:
displaying the message of the target user account in the second display mode in response to a position adjust operation on a target message in the at least one message.

6. A computer device for displaying messages, comprising: a processor, and a memory storing one or more computer programs, wherein the processor, when loading and running the one or more computer programs, is caused to perform:
displaying a message display interface of a multi-user communication group;
displaying a message of a target user account in the multi-user communication group in the message display interface in a first display mode, wherein the first display mode is a mode in which the message is displayed along a first side edge of the message display interface, an account identifier corresponding to the message in the first display mode is displayed between the message in the first display mode and the first side edge, and the account identifier comprises at least one of an avatar, a nickname, and an account identity document;
displaying a shortcut move region, wherein the shortcut move region comprises a first account display region and a second account display region, and an account identifier of the target user account is displayed in the first account display region;
displaying the message of the target user account in the message display interface in a second display mode in response to a drag operation for dragging the account identifier of the target user account from the first account display region to the second account display region, wherein the second display mode is a mode in which the message is displayed along a second side edge of the message display interface, an account identifier corresponding to the message in the second display mode is displayed between the message in the second display mode and the second side edge, the second side edge is opposite to the first side edge, and the first side edge and the second side edge correspond to different viewpoints or camps; and
canceling displaying of the shortcut move region in response to not receiving an operation on the shortcut move region within a predetermined period.

7. A non-transitory computer-readable storage medium, storing one or more computer programs, wherein the one or more computer programs, when loaded and run by a processor, cause the processor to perform:
displaying a message display interface of a multi-user communication group;
displaying a message of a target user account in the multi-user communication group in the message display interface in a first display mode, wherein the first display mode is a mode in which the message is displayed along a first side edge of the message display interface, an account identifier corresponding to the message in the first display mode is displayed between the message in the first display mode and the first side edge, and the account identifier comprises at least one of an avatar, a nickname, and an account identity document;
displaying a shortcut move region, wherein the shortcut move region comprises a first account display region and a second account display region, and an account identifier of the target user account is displayed in the first account display region;
displaying the message of the target user account in the message display interface in a second display mode in response to a drag operation for dragging the account identifier of the target user account from the first account display region to the second account display region, wherein the second display mode is a mode in which the message is displayed along a second side edge of the message display interface, an account identifier corresponding to the message in the second display mode is displayed between the message in the second display mode and the second side edge, the second side edge is opposite to the first side edge, and the first side edge and the second side edge correspond to different viewpoints or camps; and
canceling displaying of the shortcut move region in response to not receiving an operation on the shortcut move region within a predetermined period.

8. The computer device according to claim 6, wherein in the message display interface, the message of the target user account correspondingly displays the account identifier of the target user account, and the processor, when loading and running the one or more computer programs, is caused to perform:
controlling, in response to a drag operation on the account identifier of the target user account, the account identifier of the target user account to move with the drag operation; and
displaying the message of the target user account in the message display interface in the second display mode in response to the account identifier of the target user account being in a screen region corresponding to the second side edge.

9. The computer device according to claim 6, wherein the processor, when loading and running the one or more computer programs, is caused to perform:
displaying a region display control in a side edge region of the message display interface; and
displaying the shortcut move region in response to a trigger operation on the region display control.

10. The computer device according to claim 9, wherein the processor, when loading and running the one or more computer programs, is caused to perform:
determining updated display positions of the region display control and the shortcut move region in response to a move operation on the region display control and the shortcut move region; and displaying the region display control and the shortcut move region based on the updated display positions of the region display control and the shortcut move region.

11. The computer device according to claim 6, wherein the processor, when loading and running the one or more computer programs, is caused to perform:
displaying the message of the target user account in the second display mode in response to a position adjust operation on a target message in the at least one message.

12. The non-transitory computer-readable storage medium according to claim 7, wherein in the message display interface, the message of the target user account correspondingly displays the account identifier of the target user account, and the one or more computer programs, when loaded and run by the processor, cause the processor to perform:
controlling, in response to a drag operation on the account identifier of the target user account, the account identifier of the target user account to move with the drag operation; and
displaying the message of the target user account in the message display interface in the second display mode in response to the account identifier of the target user account being in a screen region corresponding to the second side edge.

13. The non-transitory computer-readable storage medium according to claim 7, wherein the one or more computer programs, when loaded and run by the processor, cause the processor to perform:
displaying a region display control in a side edge region of the message display interface; and
displaying the shortcut move region in response to a trigger operation on the region display control.

14. The non-transitory computer-readable storage medium according to claim 13, wherein the one or more computer programs, when loaded and run by the processor, cause the processor to perform:
determining updated display positions of the region display control and the shortcut move region in response to a move operation on the region display control and the shortcut move region; and
displaying the region display control and the shortcut move region based on the updated display positions of the region display control and the shortcut move region.

15. The non-transitory computer-readable storage medium according to claim 7, wherein the target user account corresponds to at least one message, and the one or more computer programs, when loaded and run by the processor, cause the processor to perform:
displaying the message of the target user account in the second display mode in response to a position adjust operation on a target message in the at least one message.

* * * * *